July 25, 1933.   A. J. GINSBERG   1,920,072
REMOVABLE EXPOSURE AND FOCUSING DEVICE FOR CAMERAS
Original Filed Oct. 27, 1928   2 Sheets-Sheet 1

WITNESSES
Edw. Thorpe
S. W. Foster

INVENTOR
Abraham J. Ginsberg
BY
Munn&Co.
ATTORNEY

July 25, 1933.  A. J. GINSBERG  1,920,072
REMOVABLE EXPOSURE AND FOCUSING DEVICE FOR CAMERAS
Original Filed Oct. 27, 1928  2 Sheets-Sheet 2
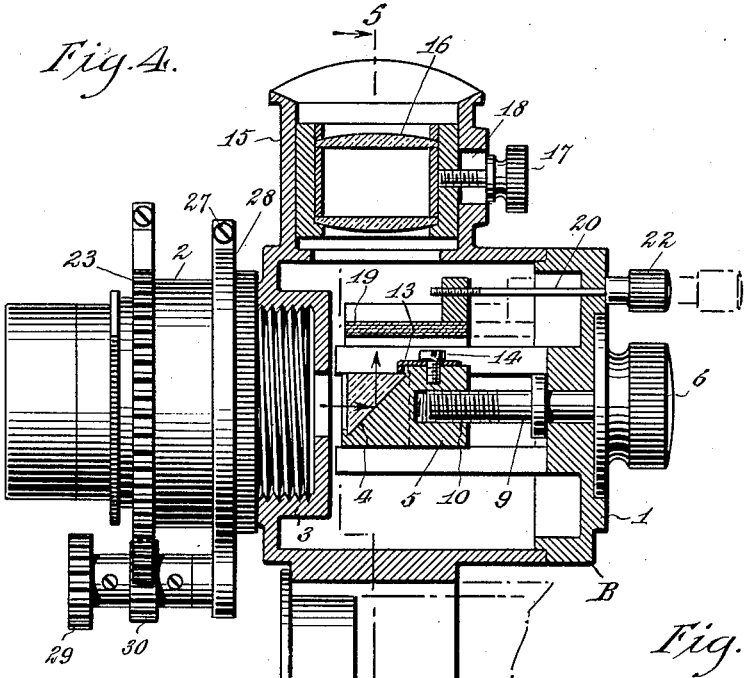
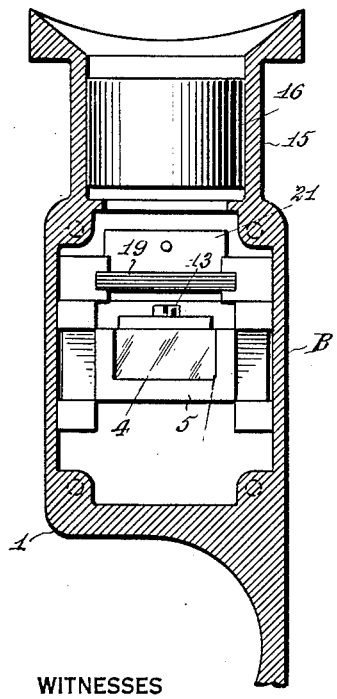
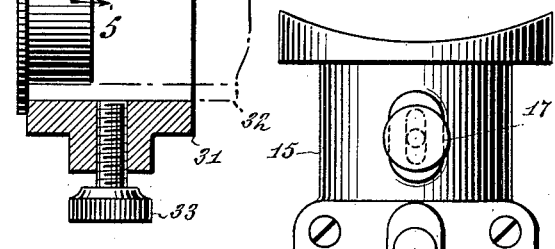
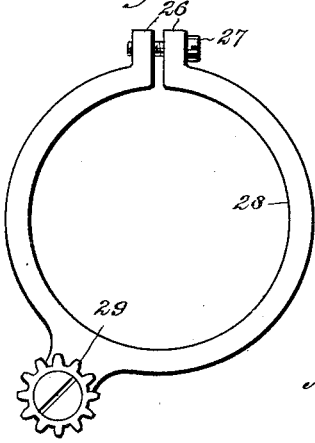
WITNESSES
Edw. Thorpe
S. W. Poster
INVENTOR
Abraham J. Ginsberg
BY
Munn & Co.
ATTORNEY Patented July 25, 1933

1,920,072

UNITED STATES PATENT OFFICE

ABRAHAM J. GINSBERG, OF NEW YORK, N. Y.

REMOVABLE EXPOSURE AND FOCUSING DEVICE FOR CAMERAS

Application filed October 27, 1928, Serial No. 315,461. Renewed June 13, 1933.

This invention relates to a removable exposure and focusing device for cameras and more particularly for motion picture cameras, an object of the invention being to provide such a device having power transmitting means between the same and the lens barrel of the camera whereby the adjustment of the exposure and focusing device is operatively connected to the camera so that the adjustment of the former will perform a like adjustment of the camera.

A further object is to provide a device of this character which dispenses with the necessity of employing tables or calculations to determine exposures and which can be operated during the taking of pictures to change the focus in relation to the moving object.

A further object is to provide a device of this character employing a simple arrangement of removable gear transmission which causes the lens of the camera to be adjusted with the adjustment of the focus of the exposure and focusing device accurately by direct vision.

A further object is to provide a novel gear transmission which is adjustable so as to secure and match the focusing device to the camera, and can be used for adjusting the focus of the various lenses of individual cameras.

My invention is adapted for use on that type of camera in which the lenses are focused by rings turning on their mounts.

A further object is to provide an improved focusing device automatically functioning to focus the camera lens to various adjustments to the individual eye and to the focal length of the lenses.

A further object is to provide a device of this character which can be manufactured and sold at a reasonable price and which will give an image right side up while focusing.

My present invention is more specifically directed to a combination of focusing device and transmitting means of the camera rather than to the specific focusing device as the broad features of the latter are the subject matter of my pending application Serial No. 267,709, filed April 5, 1928.

While in the present application I disclose improvements or refinements in the focusing device itself it is the co-operation of the device with the camera itself which is the main subject matter of the present application.

With these and other objects in view, the invention consists in certain novel features of construction and combinations and arrangements of parts which will be more fully hereinafter described and pointed out in the claims.

In the accompanying drawings—

Figure 4 is an enlarged view in vertical section on the line 4—4 of Figure 2;

Figure 5 is a view in transverse section on the line 5—5 of Figure 4;

Figure 6 is a fragmentary rear elevation of the exposure and focusing device;

Figure 7 is a detail view showing the support and mounting for the idle pinions.

Figure 1:
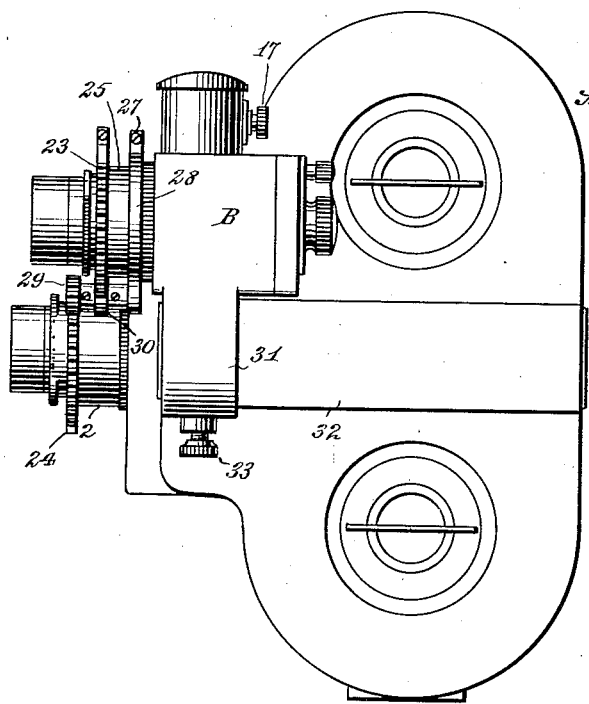
Figure 1 is a view in side elevation of a motion picture camera showing my improved exposure and focusing device removably attached thereto.
Figure 2:
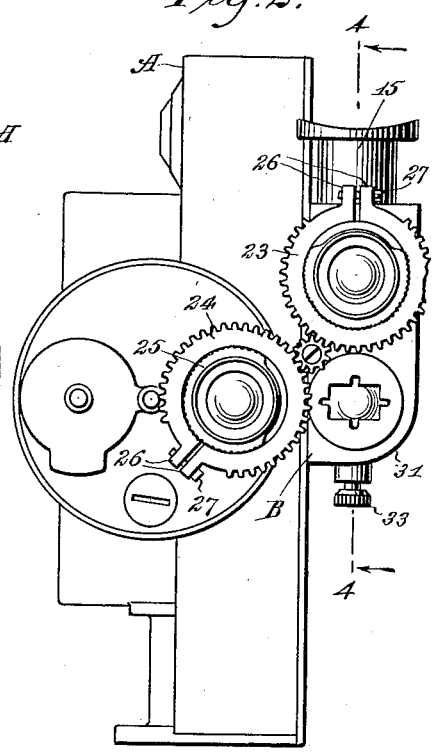
Figure 2 is a view in front elevation of Figure 1.
Figure 3:
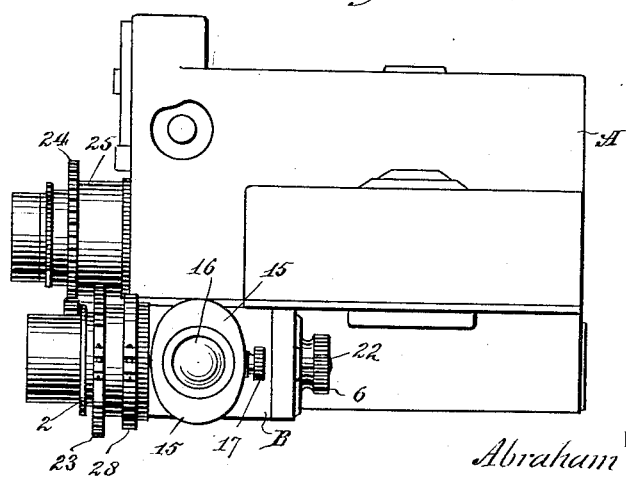
Figure 3 is a top plan view of Figure 1.

A represents a motion picture camera such as is commonly used by amateurs, and B represents my improved exposure and focusing device.

In order that the invention may be clearly understood I shall first briefly describe the focusing and exposure device. This device includes a casing 1 having a lens barrel 2 removably secured in a socket 3 in the front end of the casing and in alinement with a prism 4 mounted in a prism carrier 5, and this carrier 5 is longitudinally adjustable through the medium of a button 6 on the rear end of the casing having a screw threaded stem 9 which is screwed into a threaded socket 10 in the carrier 5 so that when this button is turned the position of the prism is varied.

In Figure 6 I show the button 6 as having a scale dial 11 thereon and a headed screw 12 to secure the button against accidental movement when properly adjusted. The prism 4 is removably held in the carrier 5 by means of a spring tongue 13 held in place by a screw 14. All of the parts are removable and capable of replacement and also capable of an easy and economical assemblage.

On the top of the casing 1 a sight tube 15 is provided in which a sighting device 16 has a sliding mounting and is adjustably secured to suit the user through the medium of a screw 17 extending through a slot 18 in tube 15 and screwed into the sighting device 16. This sighting device may comprise a pair of magnifying lenses such as indicated or it may take any suitable form desired.

Between the sighting device 16 and the prism 4 a transparent or translucent suitably colored plate or member 19 is located and is movable from said position through the medium of a rod 20 fixed to a block 21 carrying the member 19. This rod 20 projects through the rear of the casing 1 and has a knob 22 thereon which may be drawn rearwardly to move the member 19 out of position above the prisms or allow the same to move forwardly to position the member 19 in the line of vision.

All of these features above described in connection with my focusing device are covered in my copending application above referred to and are here set forth merely in order that a clear understanding of the present invention may be had, which includes the adjustment, by mechanical means such as gearing, the operation or adjustment or focusing or whatever the term may be, of the exposure and focusing device with the turning lens adjusting ring of camera so that when this focusing device is operated an exact reproduction or operation is transmitted to the focusing means of the camera so that a picture will be taken in exact accordance with the adjustment of the focusing device.

To bring about this desired result I preferably employ split gear bands 23 and 24 which are clamped around the lens barrel 2 of the focusing device B and around the lens barrel 25 of the camera, respectively.

I refer to these parts 23 and 24 as "split gear bands" because they are in effect bands which when expanded can be easily slipped over the barrels and are provided with perforated lugs 26 for the reception of an adjusting bolt 27 to contract the band and clamp it on the barrel.

A clamping band 28 is mounted on a stationary part of the lens barrel 2 and supports a rod or shaft on which removable pinions 29 and 30 are secured. Where the gears 24 and 23 are in alinement only one of these gears is of course necessary and the other constitutes an idle gear connecting the gears, but where the attachment of the camera is such that the gears are not in alinement it is necessary to employ two of these pinions, and these pinions are readily removable and adjustable so as to properly mesh with the gears.

It is to be understood of course that the lens barrel and adjusting mechanism at the front of the exposure and focusing device are similar to the analogous parts of the camera so that, when the lens barrel of the exposure and focusing device is adjusted to secure the proper focus, an exact adjustment of the camera lens is simultaneously performed.

The movement between the two lenses can be accomplished, when the adjusting mechanisms are dissimilar, by the use of the different sized idle pinions 29.

The diaphragms may be coupled to move together by similar gearing if desired.

It is of course to be understood that the exposure and focusing device may be removably attached to the turning lens adjusting ring of the camera in any suitable manner in accordance with the particular make or form of camera with which it is used.

In the drawings I illustrate one form which includes a curved arm 31 that engages over a curved enlargement 32 on the camera A and is secured by a set screw 33.

Various changes and alterations might be made in the general form of the parts described without departing from my invention and hence I do not limit myself to the precise details set forth but consider myself at liberty to make such changes and alterations as fairly fall within the spirit and scope of the appended claims.

I claim:

1. A principal lens system, a revoluble barrel containing the system having associated means for axially moving the barrel and system for focusing during revolution, a view-finder comprising a lens system, a revoluble barrel containing said lens system having associated means for axially moving the barrel and system for focusing during revolution, an eye piece having an objective for intercepting the image formed by the view-finder lens system, a gear on each lens barrel, and a connecting idler pinion arrangement causing rotation of the barrels, split rings on which the gears are formed providing for ready application of the gears to their respective lens barrels and for adjustment of the gears along the barrel, a split ring carrying an idler pinion.

2. A principal lens system, a barrel containing the principal lens system, a view-finder comprising a lens system, a barrel containing the view-finder lens system, an eye piece having an objective for intercepting the image formed by the view-finder lens system, and driving means for producing identical movements of the barrels, said means coupling the barrels for imparting said movements circumferentially and axially of the barrels, and means for removably connecting the driving means to the barrels and for adjustably positioning said means along said barrels.

3. A pair of image-forming lens systems, a separate focusing device for adjusting the focus of each system, and a synchronizing coupling between the focusing devices, one image-forming lens system being located substantially above the other system.

4. The combination of a camera lens of the type adapted to be focused by turning a ring on the lens barrel, a focusing attachment comprising an object lens, a barrel for said object lens and means to axially adjust the barrel by turning, a gear train connecting both barrels for simultaneous operation, and means for removably supporting the gear train from the barrels.

ABRAHAM J. GINSBERG.